(No Model.) 2 Sheets—Sheet 1.

F. COOK.
VEGETABLE AND FRUIT DRYING APPARATUS.

No. 281,838. Patented July 24, 1883.

Witnesses.
Robert Everett,
H Clay Smith

Inventor.
Frank Cook.
By Thos. S. Smith,
Atty.

(No Model.) 2 Sheets—Sheet 2.

F. COOK.
VEGETABLE AND FRUIT DRYING APPARATUS.

No. 281,838. Patented July 24, 1883.

Witnesses.
Robert Everett,
H. Clay Smith.

Inventor:
Frank Cook,
By Thos. S. Smith,
Atty.

UNITED STATES PATENT OFFICE.

FRANK COOK, OF CLEMMONSVILLE, NORTH CAROLINA.

VEGETABLE AND FRUIT DRYING APPARATUS.

SPECIFICATION forming part of Letters Patent No. 281,838, dated July 24, 1883.

Application filed February 1, 1883. (No model.)

*To all whom it may concern:*

Be it known that I, FRANK COOK, a citizen of the United States, residing at Clemmonsville, in the county of Davidson and State of North Carolina, have invented certain new and useful Improvements in Vegetable and Fruit Drying Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an apparatus for drying fruit, vegetables, grain, and the like; and the novelty consists in the construction and arrangement of parts, as will be more fully hereinafter set forth, and specifically pointed out in the claims.

The invention is designed as an improvement upon the construction set forth in the Patent No. 264,246, granted to me September 12, 1882.

The invention consists, essentially, in a double series of pivoted shelves, each having a steam-chamber beneath the pan and steam-connections from each chamber to the pivotal standards, which of themselves are steam-pipes. The pans swing in opposite directions, and the free end of each pan is also provided with a projecting tube, which, when the pan is in position, forms a steam-connection with a central abutting standard, which also is a steam-conductor.

The minor elements of construction, differing from the patent mentioned, will be set forth in the general description which follows.

The invention is fully illustrated in the accompanying drawings, which form a part of this specification, and in which—

Figure 1:
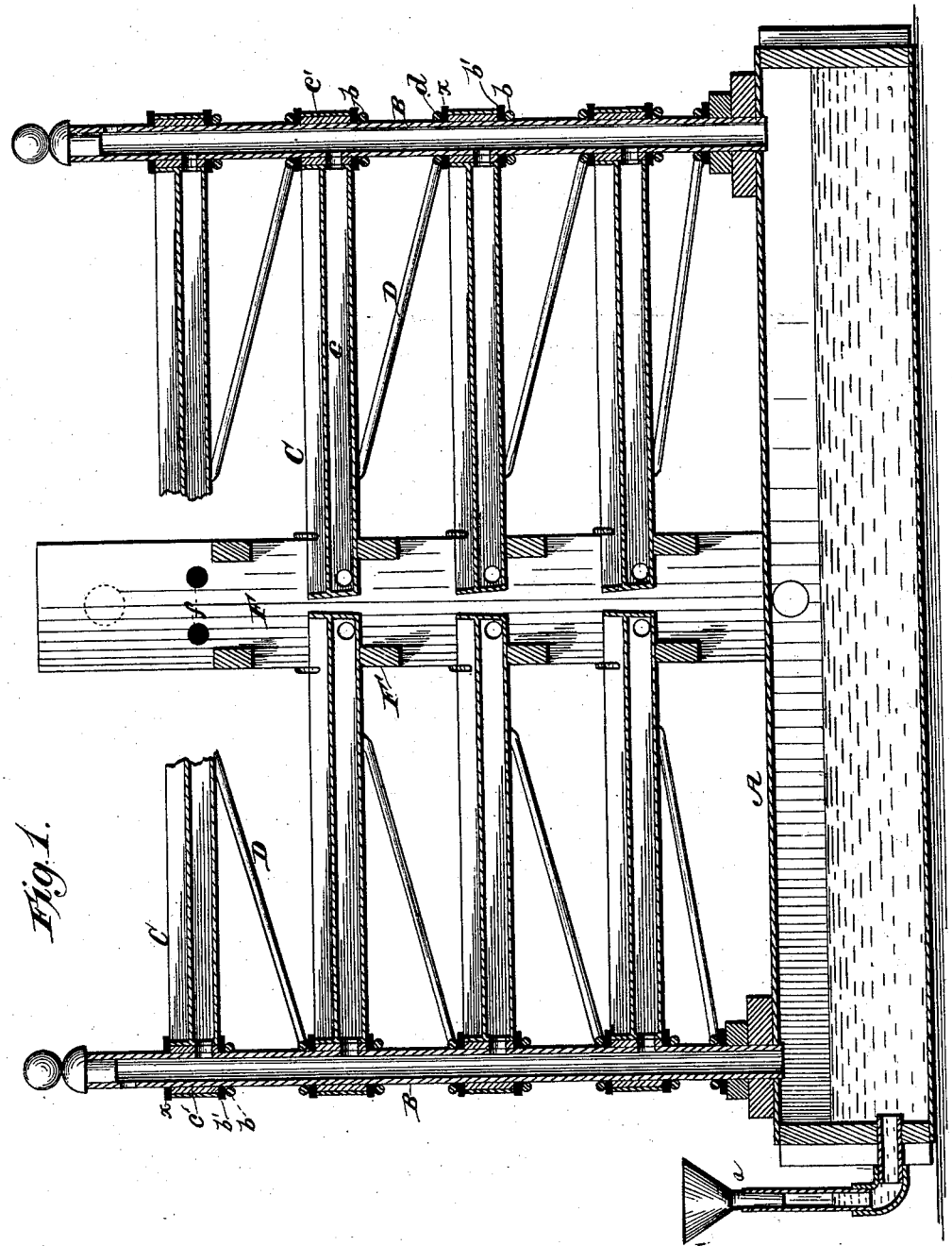
Figure 2:
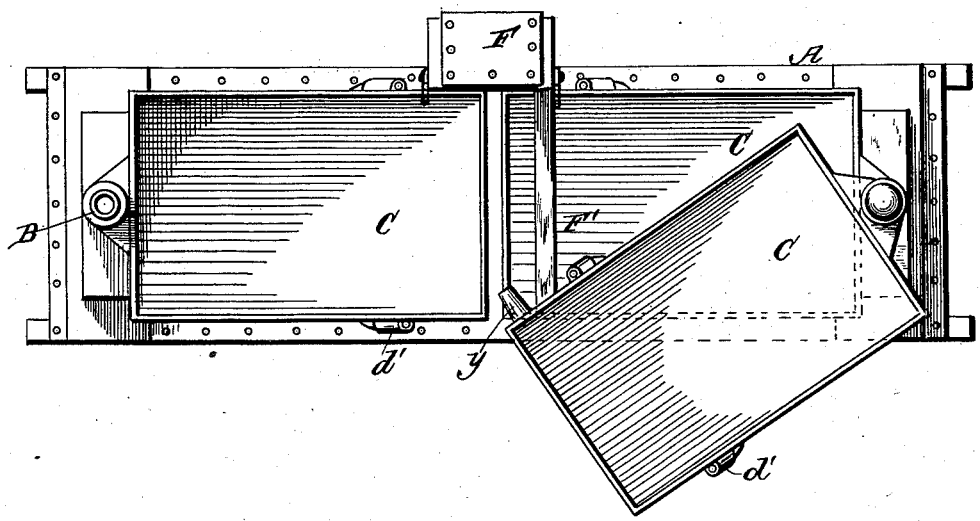
Figure 3:
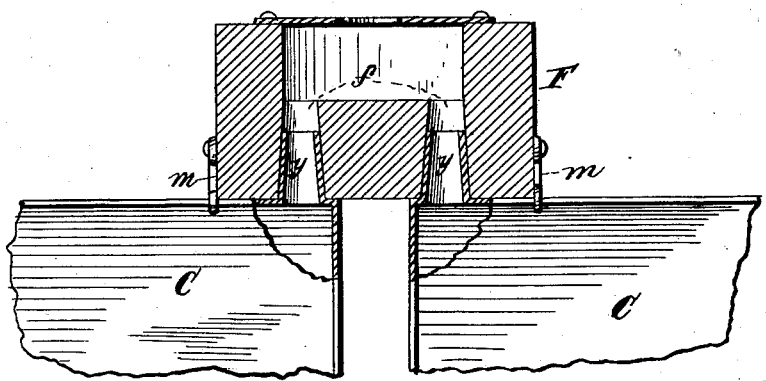

Figure 1 is a central longitudinal vertical section, showing the duplex arrangement of pipe-standards and pans. Fig. 2 is a top plan view with one of the upper pans turned out of alignment, and Fig. 3 is a horizontal section through the central conductor, showing the connection between the steam-conduit and the pan-pipes.

Referring to the drawings, A represents a tank or boiler, which is placed in such proper relation to a furnace as to generate steam, and it is fed with water by means of the funnel and pipe $a$.

B B represent pipe-standards placed upon each end of the boiler or tank A, and having open communication with the interior of the tank. Each pipe-standard is provided with rings $b$, secured equidistant from each other, and upon these rings rest washers $b'$.

C C represent pans having steam-chambers $c$ and sockets $c'$, which embrace the standards and rest upon the washers $b'$. When in operative position there is a steam-connection between each pan-chamber $c$ and the steam-passage in the pipe-standards; but when the pans are thrown out of alignment the steam-connection is entirely cut off. A washer, $x$, is placed above each of the sockets $c'$, and upon these rest the eyes $d$ of inclined arms D, which have bent ends which fit into sockets $d'$, formed in the sides of the pans, and these arms D serve not only to support the outer ends of the swinging pans, but to relieve the sockets $c'$ from strain. Each series of pans swing outward from a central abutting standard, F, which is also a steam-conductor, and has steam-connection with the boiler or generator A. This standard F forms an abutment for each series of pans, and arms F', projecting therefrom, serve to support the free ends of the pans when in operation. The steam-passage in this standard is upon the outer side, while the greater inner portion is composed of wood, in which conical holes $f$ are formed to correspond with conical pipes $y$, formed upon the pans. When the pans are swung outward from the standard F, the pipes $y$ serve to let off the water of condensation; but when thrown back into operative position, the said pipes form a steam-connection with the free ends of the pans, thus giving two steam-inlets to each pan when in operation and preventing condensation. There is sufficient space between the two series of pans at their ends to allow this water of condensation to pass off without striking either tray portion, and a small plug may be inserted in the steam-port in the standard F to prevent loss of steam. The sockets $d'$ give a firm and steady hold to the trays, and packing is interposed between the sockets $c'$ and the pipe-standards.

At a point above the several pans in each of the pipe-standards B, and also in the center standard, F, are arranged proper steam-exits, which serve to keep up the proper circulation of steam, and these exits are governed by proper valves, which will permit the operator to gage the amount of flow at will.

The pans are held in operative position by hooks $m$, pivoted upon the central standard, upon either side, and when it is desired to swing either of the pans outward the hook $m$ may readily be raised to release it.

Many advantages accrue to the construction, among which may be mentioned:

First. The pans, when in operation, have no steam-outlet. Consequently a higher degree of heat may be maintained.

Second. The steam-outlets which allow the steam circulation are in the standards above the pans.

Third. Two sets or series of pans are employed, economizing space.

Fourth. The outlet for water of condensation when the pans are swung outward serves also as a steam-conductor when the pans are in place.

Having thus described my invention, what I claim, and desire to secure by Letters Patent of the United States, is—

1. The central standard, F, having arms F', combined with pivoted pans adapted to swing in opposite direction, the said standard connecting the steam-reservoir with the steam-chamber in said pans when the pans are in operative position, as set forth.

2. The pans C, having steam-chambers $c$, sockets $c'$, and sockets $d'$, combined with the inclined arms D, having eyes $d$, and also having conical pipes $y$, combined with the steam-standard F, said pipes $y$ serving as steam-connections with the steam-conduit of said standard when the pans are in operation, and as exits for water of condensation when the said pans are thrown out of alignment, as set forth.

3. In combination with the pipe-standards B, arranged upon each end of the steam-generator and having connection therewith, and the central steam-standard, F, the two sets of pivoted pans having steam-inlets at each end, and steam-chambers $c$, sockets $c'$, pipes $y$, and sockets $d'$, the arms D, and the steam-generator, as and for the purposes set forth.

In testimony whereof I affix my signature in presence of two witnesses.

FRANK COOK.

Witnesses:
 N. S. COOK,
 C. B. ZIGLAR.